(12) United States Patent
Bai

(10) Patent No.: US 7,779,867 B2
(45) Date of Patent: Aug. 24, 2010

(54) MINIATURE VALVE

(75) Inventor: Yushen Bai, Guangdong Province (CN)

(73) Assignee: Shenzhen Mindray Bio-Medical Electronics Co., Ltd. (CN)

( * ) Notice: Subject to any disclaimer, the term of this patent is extended or adjusted under 35 U.S.C. 154(b) by 868 days.

(21) Appl. No.: 11/564,901

(22) Filed: Nov. 30, 2006

(65) Prior Publication Data

US 2008/0006336 A1 Jan. 10, 2008

(30) Foreign Application Priority Data

Jul. 4, 2006 (CN) .................... 2006 1 0021361

(51) Int. Cl.
*F16K 1/16* (2006.01)

(52) U.S. Cl. ................ 137/875; 137/625.44; 251/298; 251/303

(58) Field of Classification Search ............ 137/625.44, 137/636, 870, 871, 863; 251/129.2, 298, 251/303, 331
See application file for complete search history.

(56) References Cited

U.S. PATENT DOCUMENTS

| 479,795 | A | * | 8/1892 | Fortier | 137/870 |
|---|---|---|---|---|---|
| 1,001,401 | A | * | 8/1911 | Hicks | 137/636 |
| 2,825,308 | A | * | 3/1958 | Klee | 137/636 |
| 2,935,086 | A | * | 5/1960 | Lehman et al. | 137/599.11 |
| 3,019,815 | A | * | 2/1962 | Nelson et al. | 137/883 |
| 3,056,867 | A | * | 10/1962 | Eitel | 137/636 |
| 3,683,962 | A | * | 8/1972 | Good | 137/868 |
| 4,029,295 | A | * | 6/1977 | Wassmer | 137/625.44 |
| 4,574,841 | A | | 3/1986 | Hugler | 137/625.44 |
| 4,944,487 | A | | 7/1990 | Holtermann | 251/129.17 |
| 4,986,308 | A | * | 1/1991 | Champseaux | 137/625.44 |
| 5,027,857 | A | * | 7/1991 | Champseix | 137/625.44 |

(Continued)

FOREIGN PATENT DOCUMENTS

CN 2566077 8/2003

(Continued)

OTHER PUBLICATIONS

SIPO Search Report for corresponding Chinese application, 2 pages, dated Sep. 20, 2006.
SIPO Office Action for corresponding Chinese application, 5 pages, dated Sep. 26, 2008.

*Primary Examiner*—John Rivell
*Assistant Examiner*—Craig Price
(74) *Attorney, Agent, or Firm*—Vista IP Law Group, LLP.

(57) ABSTRACT

The present invention relates to a miniature valve, which includes a valve body comprising an inflow channel, an outflow channel and a liquid chamber, and a close assembly comprising a driver, a rocker and a valve film. The close assembly connects to the valve body and is configured to selectively close the inflow channel and the outflow channel. The rocker can be driven by the driver to move, so that the movement thereof acts on the valve film and makes the valve film selectively close the channel. The rocker and the valve film are separate components. The valve film, an elastic film locating in the liquid chamber, has a size configured to cover the inflow channel and the outflow channel. The miniature valve according to the present invention doesn't have interior dead area and has a slight effect on liquid fluctuation when switching channels.

16 Claims, 4 Drawing Sheets

U.S. PATENT DOCUMENTS

| | | | |
|---|---|---|---|
| 5,040,567 A | 8/1991 | Nestler et al. | 137/625.44 |
| 5,199,462 A | 4/1993 | Baker | |
| 5,205,323 A | 4/1993 | Baker | 137/625.44 |
| 5,653,422 A * | 8/1997 | Pieloth et al. | 137/625.44 |
| 5,983,941 A * | 11/1999 | Fritz et al. | 137/625.65 |
| 6,003,552 A | 12/1999 | Shank et al. | 137/625.44 |
| 6,220,299 B1 | 4/2001 | Arvidsson | |
| 6,318,408 B1 * | 11/2001 | Fukano et al. | 137/625.44 |

FOREIGN PATENT DOCUMENTS

| | | |
|---|---|---|
| DE | 3507144 | 9/1985 |
| DE | 4224389 | 1/1994 |
| EP | 0949438 | 10/1999 |
| WO | WO2005080841 | 9/2005 |

* cited by examiner

MINIATURE VALVE

RELATED APPLICATIONS

This application claims priority to Chinese Patent Application 200610021361.X, filed on Jul. 4, 2006, the contents of which are hereby incorporated by reference herein in its entirety.

BACKGROUND OF THE INVENTION

1. Field of the Invention

The present invention generally relates to liquid valves and, more particularly, to a miniature valve which is applied to a liquid control system and is used for switching the direction of the liquid flow, or communicating and blocking the liquid flow.

2. Discussion of the Related Art

Miniature valves includes multiple types. Based on the valve structure, they can be generally divided into isolated mode and non-isolated mode; while based on the driving structure, it can be divided into direct-acting mode, lever mode and priority mode. A sealed mode of the miniature valve generally refers to annular seal. Conventional isolated mode, lever-structure and annularly sealed valves are disclosed in U.S. Pat. Nos. 6,003,552, 5,205,323 and 5,199,462. A conventional isolated mode, direct-acting and annularly sealed valve is disclosed in U.S. Pat. No. 4,944,487.

However, these valves disclosed in U.S. Pat. Nos. 6,003,552, 5,205,323 and 5,199,462 have following shortcomings. Firstly, the liquid chambers thereof have a rather complicated shape, thus resulting in leftover and large dead areas therein. Secondly, when switched, the movement of the valve films in these valves results in rather violent liquid fluctuations in pipelines. Thirdly, these valves can be driven by solenoid only. The valve disclosed in U.S. Pat. No. 4,944,487 is subjected to such shortcomings as poor capability of enduring liquid pressure, solenoid drive and narrower application scope.

SUMMARY OF THE INVENTION

An object of the present invention is to provide an improved miniature valve without interior dead area and having slight effect on liquid fluctuation when switching channels.

The present invention realizes the above object by providing a miniature valve, which includes a valve body and a driver positioned thereon. The valve body includes a supporting device, a valve seat, a valve film and a rocker. The valve seat has a first partition wall and defines a first channel and a second channel. The first channel and the second channel are spaced by the first partition wall. The supporting device and the valve seat are connected and together define a chamber therebetween. The valve film, an elastic film set in the chamber, divides the chamber into a liquid chamber and an installing chamber. The valve film has size configured to cover the two channels and the first partition wall. The rocker having a lever structure is rotatablely positioned in the chamber via a shaft and has a force-receiving end and a first force-exerting end, wherein the first force-exerting end is configured to be able to press against the valve film. The force-receiving end and the first force-exerting end respectively locate at two sides of the shaft. The rocker defines a first position and a second position. When the rocker locates at the first position, the first force-exerting end presses a portion of the valve film facing the first partition wall on the first partition wall so as to separate the liquid chamber from the first channel and communicate the liquid chamber with the second channel; when the rocker locates at the second position, the pressed portion of the valve film disengages from the first partition wall so that the first channel, the liquid chamber and the second channel communicate.

The rocker further comprises a second force-exerting end locating at the same side of the shaft as the first force-exerting end, and the second force-exerting end is configured to be able to press against the valve film.

The valve seat further defines a third channel adjacent to and communicating with the second channel and further defines a second partition wall spacing the second channel and the third channel. The valve film has a size configured to cover the third channel and the second partition wall. When the rocker locates at the second position, the second force-exerting end presses a second portion of the valve film facing the second partition wall on the second partition wall.

The shape of the rocket is approximately in a Y-shape, with the first force-exerting end and the second force-exerting end locating at one end of the rocket, while the force-receiving end locating at the other end of the rocket. The mid portion of the rocket rotatablely engages with the shaft.

The supporting device tightly presses a periphery of the valve film on the valve seat.

Each of the partition walls has a plane configured for contacting the valve film when the valve film is pressed thereon.

The miniature valve further comprises a driven bar as a transmission element, wherein the driven bar movably installed in the installing chamber moves along a direction perpendicular to the axis direction of the shaft, with one end thereof connecting to one end of an elastic element and the other end thereof connecting to an output portion of the driver. The other end of the elastic element presses against a chamber wall of the installing chamber. The driven bar is connected with the force-receiving end of the rocker at approximately the mid portion via a pivot, and the rocker is configured to swing back and forth between the first utmost position and the second utmost position depending on a drive force of the driver and a restoring force of the elastic element.

The driver is selected from the group consisting of a solenoid-driving device and a cylinder-driving device.

Each of the channels is configured to form a streamline flow channel together with the liquid chamber in a communicating state.

The present invention further provides a miniature valve, which includes a valve body comprising an inflow channel, an outflow channel and a liquid chamber; and a close assembly connecting to the valve body and configured to selectively close the inflow channel and the outflow channel. The close assembly comprises a driver, a rocker and a valve film. The rocker is driven by the driver to move, so that the movement of the rocker acts on the valve film to make the valve film selectively close the channel.

The rocker and the valve film are separate components, and the valve film is elastic, which locates in the liquid chamber and has a size configured to cover the inflow channel and the outflow channel. It should be pointed out that the term "separate" used herein is in contrast with the interconnected rocker and valve film in the prior art. Though the rocker and valve film according to the present invention are not fixedly interconnected, they may contact with each other at certain positions.

One end of the rocker connects to a transmission element of the driver via a pivot, and the other end of the rocker is configured to exert pressure on the valve film, so that the valve film being tightly pressed on the wall of a selected channel separates the liquid communication between the selected channel and the liquid chamber.

The outflow channel comprises a first outflow channel and a second outflow channel. The rocker in an approximate Y-shape comprises a force-receiving end connected to the driver and two force-exerting ends configured to selectively exert a pressure on the valve film. The force-receiving end can be driven by the driver to move towards a first direction, thereby driving the force-exerting ends to move, so that the force-exerting end adjacent to the first outflow channel tightly presses the corresponding portion of the valve film on a wall of the first outflow channel and thereby separate communication between the first outflow channel and the liquid chamber. The force-receiving end can also be driven by the driver to move towards a direction opposite to the first direction, thereby driving the force-exerting ends so that the force-exerting end adjacent to the second outflow channel tightly presses the corresponding portion of the valve film on a wall of the second outflow channel and thereby separate communication between the second outflow channel and the liquid chamber.

The driver is selected from a solenoid-driving device and a cylinder-driving device.

The miniature valve further comprises an elastic element arranged at one side of the force-receiving end of the rocker. When the driver is unactuated, the elastic element presses the rocker to a default position which may be a position either for separating the first outflow channel or a position for separating the second outflow channel.

The periphery of the valve film is liquid-hermetically fixed at the periphery of the liquid chamber.

The present invention achieves the following advantageous effect: 1) the flow chamber communicates at least with one channel at the first and the second positions, as a result of which there is no dead area inside the valve. Besides, as the switch of channels is realized by way of elastic distortion occurring when pressure is exerted upon the valve film, and as the valve film moves a short distance during the switch, the influence upon the flowing liquid in the channels is significantly reduced, so that violent fluctuation of the flowing liquid is avoidable. 2) As the periphery of the liquid chamber is sandwiched between the supporting device and the valve seat, the valve film has improved capability of enduring liquid pressure; 3) It is possible to drive the valve via a solenoid-driving device as well as a cylinder-driving device, the valve may be more widely applied. 4) The streamline shape of the liquid channel reduces the flowing resistance.

Other and further objects of the invention will be apparent from the following drawings and description of preferred embodiments of the invention in which like reference numerals are used to indicate like parts in the various views.

BRIEF DESCRIPTION OF THE DRAWINGS

Many aspects of the present miniature valve can be better understood with reference to the following drawings. The components in the drawings are not necessarily drawn to scale, the emphasis instead being placed upon clearly illustrating the principles of the present miniature valve. Moreover, in the drawings, like reference numerals designate corresponding parts throughout the several views.

DESCRIPTION OF THE PREFERRED EMBODIMENTS

Figure 1:
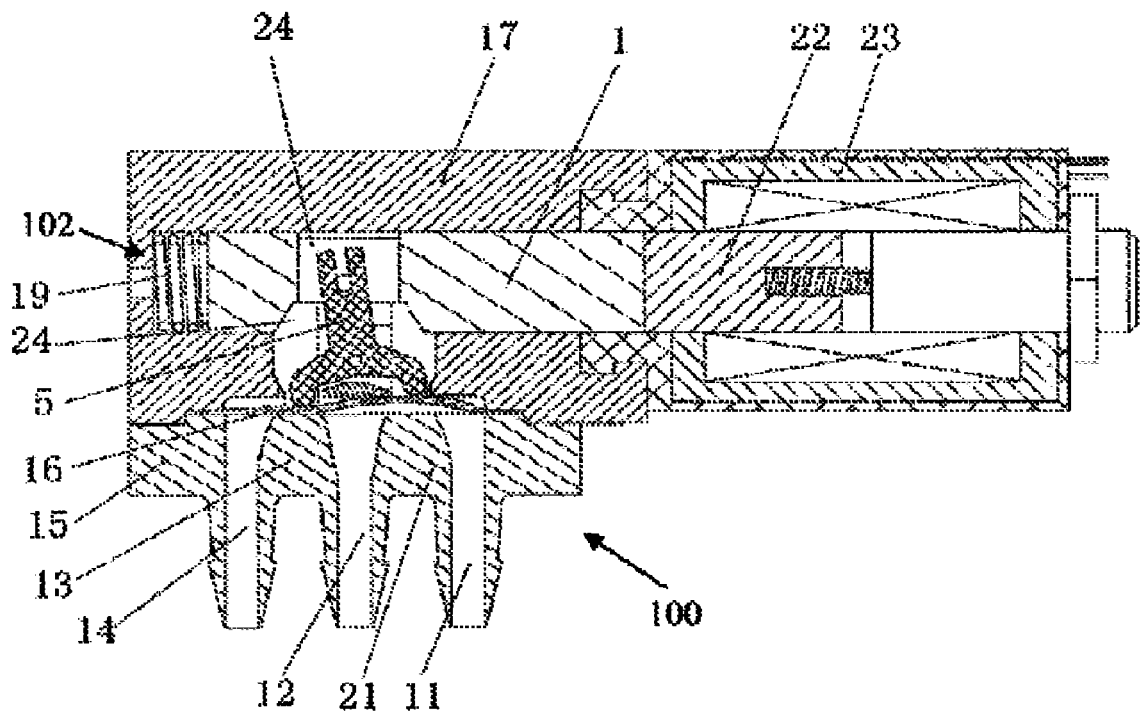
FIG. 1 is a cross-sectional view of a miniature valve in accordance with the first preferred embodiment of the present invention.
Figure 2:
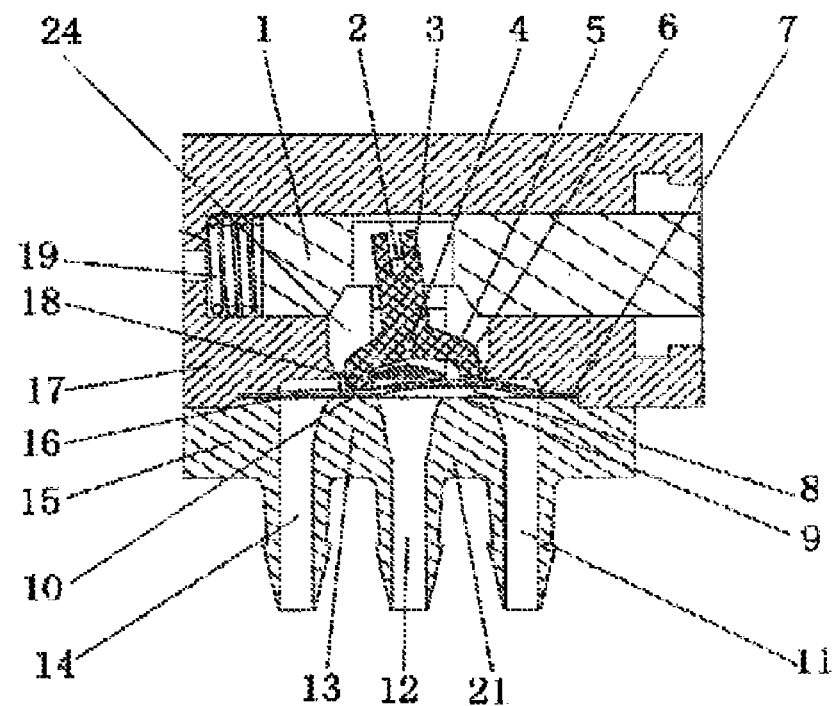
FIG. 2 is a cross-sectional view of a valve body of the miniature valve of FIG. 1.
Figure 3:
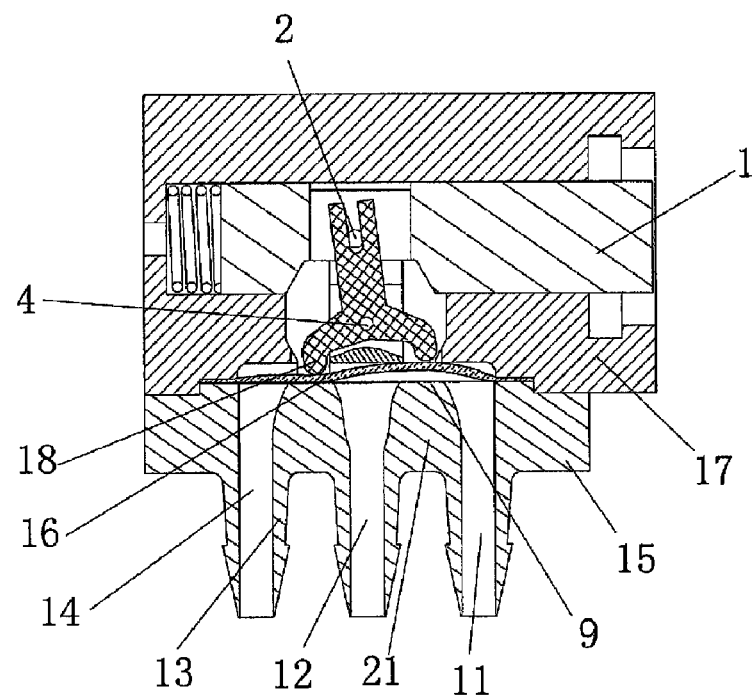
FIG. 3 is a cross-sectional view of the valve body of the miniature valve of FIG. 1, showing a rocker of the valve body is in the first position.
Figure 4:
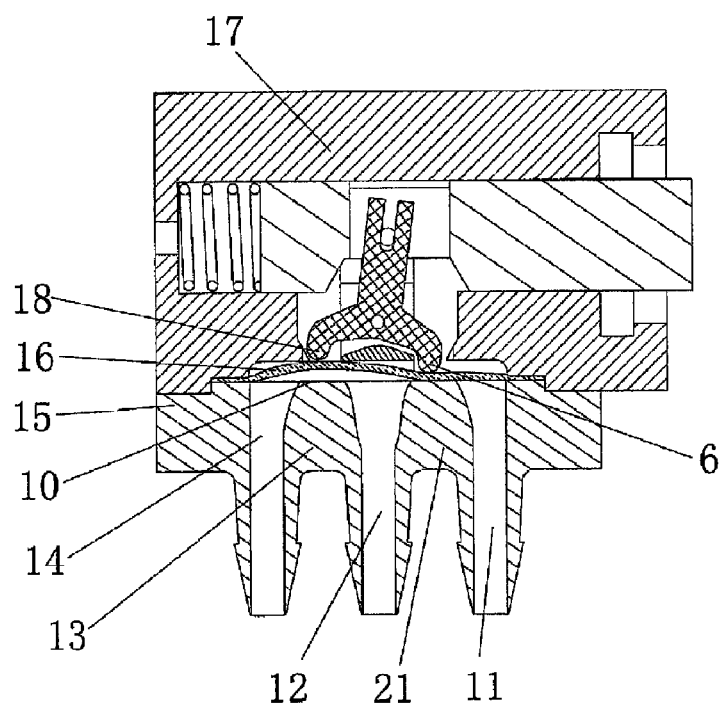
FIG. 4 is a cross-sectional view of the valve body of the miniature valve of FIG. 1, showing the rocker of the valve body is in the second position.
Figure 5:
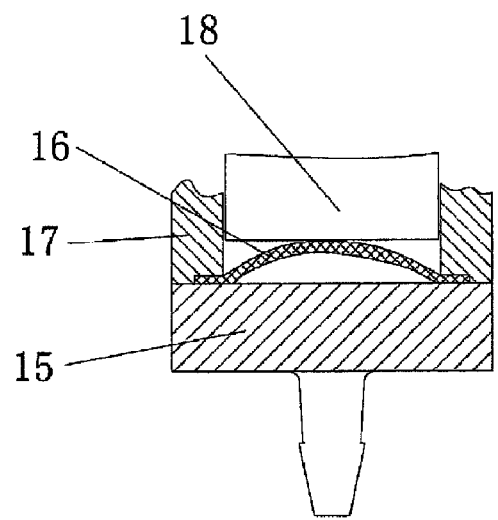
FIG. 5 is a cross-sectional view of a valve film and a first partition wall of the miniature valve of FIG. 1, showing the valve film and the first partition wall are in a disengaging state.
Figure 6:
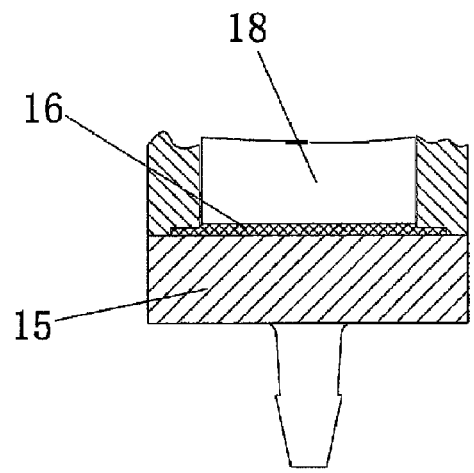
FIG. 6 is a cross-sectional view of the valve film and the first partition wall of the miniature valve of FIG. 1, showing the valve film and the first partition wall are in an impacted state.

Reference will now be made to the figures to describe the present invention in detail.

Referring to FIGS. 1 to 6, a miniature valve in accordance with the first preferred embodiment of the invention is shown. In this embodiment, the miniature valve as shown is a three-way valve comprising a valve body 100 and a driver 23 positioned at a side of the valve body. The driver 23 is advantageously a solenoid acting as a dynamical source. The valve body can switch liquid pipelines under drive of the driver 23.

The valve body includes a supporting device 17, a valve seat 15, a rocker 5, a driven bar 1 and a valve film 16. The supporting device 17 is tightly pressed against the valve seat 15 and defines a chamber together with the valve seat 15 therebetween. The valve film 16, an elastic quadrate slice, is tightly sandwiched between the supporting device 17 and the valve seat 15. The valve film 16 divides the chamber into two parts, i.e., a liquid chamber 8 and an installing chamber 24. The liquid chamber 8 faces to the valve seat 15 and the installing chamber 24 is opposite to the valve seat 15. Because the valve film 16 can generate distortion upon pressure, the volume of the liquid chamber 8 is variable. In this embodiment, the surface on which the supporting device engages with the valve seat is concave so as to define an installing slot 7, and the periphery of the valve film 16 is firmly embedded in the installing slot 7.

The valve seat 15 defines a first channel 14, a second channel 12 and a third channel 11, which channels are juxta-positional (i.e., parallel each other) and communicate with the liquid chamber 8. The first channel 14 and the second channel 12 are spaced by a first partition wall 13, while the second channel 12 and the third channel 11 are spaced by a second partition wall 21. The valve film 16 is large enough to entirely cover the three channels and the two partition walls. It should be noted that the term "cover" herein does not mean to cut off the communication between the channels and the liquid chamber. In order to decrease flow resistance, each of the channels 14, 12 and 11 is connected with the liquid chamber 8 in a manner that a streamline flow channel is formed. One or two of the three channels can be defined as inflow channel(s), and correspondingly the remaining as outflow channel(s), if necessary. In this embodiment, the second channel 12 is advantageously an inflow channel, and the first channel 14 and the third channel 11 are advantageously outflow channels.

The supporting device 17 has a shaft 4 positioned therein. The rocker 5 is arranged in the installing chamber 24 and engages with the shaft 4 to construct a lever structure. Specifically, the rocker 5 is approximately in a Y-shape and includes a force-receiving end 3, a first force-exerting end 18 and a second force-exerting end 6. The force-receiving end 3 and the force-exerting ends 18, 6 respectively locate at two sides of the shaft 4. The first force-exerting end 18 and the second force-exerting end 6 are substantially symmetrical with relation to the shaft 4, respectively adjacent to the first partition wall 13 and the second partition wall 21. The force-receiving end 3 is configured (i.e., structured and arranged) for receiving drive force. The valve film 16 locates between the rocker 5 and the two partition walls 13, 21, and also locates at the moving tracks of the force-exerting ends 18, 6, i.e., the force-exerting ends 18, 6 is configured to be able to press against the valve film. The rocker 5 has a first utmost position and a second utmost position along its moving track. When the rocker 5 swings between the first utmost position and the second utmost position, the force-exerting ends 18, 6 alternately press the valve film 16 to contact the two partition walls 13, 21. During contacting, surfaces 10, 9 whereby the two partition walls 13, 21 joint with the valve film 16 are sealed, and the sealed surfaces 10, 9 are coplanar.

The driven bar 1 is installed in the installing chamber 24 and can move along a lengthways direction perpendicular to the shaft 4 and parallel to the sealed surfaces 10, 9 of the two partition walls 13, 21. The driven bar 1 is connected to the force-receiving end 3 of the rocker 5 via a hinge 2 so that the movement of the driven bar 1 can drive the rocker 5 to swing around the shaft 4 in a certain angle range. One end of the driven bar 1 connects to one end of a compression spring 19, and the other end of the driven bar 1 connects to an output portion 22 of the driver 23. The other end of the compression spring 19 presses against a chamber wall 102 of the installing chamber 24 so that the compression spring 19 can compel the driven bar 1 to move towards the driver 23. The driver 23 can compel the driven bar 1 to overcome a force of the compression spring 19 and move towards the compression spring 19.

In this embodiment, the sliding direction of the driven bar 1 is defined as the x-axis direction, the axis direction of the shaft 4 as the y-axis direction, and the flowing direction of the liquid in the channels 14, 12 and 11 as the z-axis direction. A plane defined by the moving track of the rocker parallels to the x-z plane.

In operation, when the driver 23 drives the rocker 5 to rotate to the first utmost position via the driven bar 1, the first force-exerting end 18 of the rocker 5 presses on a portion of the valve film 16, which portion is located on only one side instead of all sides of the first channel 14, in order to cause the portion of the valve film 16 to be tightly pressed on the sealed surface 10 of the first partition wall 13 to seal off the only one side instead of all sides of the first channel 14 and hence separate the liquid chamber 8 from communicating with the first channel 14, and the valve film 16 disengages from the sealed surface 9 of the second partition wall 21. As a result, the opening of the first channel 14 is completely blocked by the valve film 16 so that the first channel 14 and the second channel 12 are separated. At the same time, the second channel 12 and third channel 11 are communicated through the liquid chamber 8. In addition, a bottom surface of the supporting device 17 can support the valve film 16 when the valve film 16 is pressed by a liquid, so that the valve film 16 has enhanced capability of enduring liquid pressure.

When the driver 23 drives the rocker 5 to rotate to the second utmost position via the driven bar 1, the valve film 16 is tightly pressed on the sealed surface 9 of the second partition wall 21 by the second force-exerting end 6 of the rocker 5, and the valve film 16 disengages from the sealed surface 10 of the first partition wall 13. As a result, the opening of the third channel 11 is completely blocked by the valve film 16 so that the third channel 11 and the second channel 12 are separated. At the same time, the first channel 14 and second channel 12 are communicated through the liquid chamber 8.

When the rocker 5 swings back and forth between the first utmost position and the second utmost position depending on a drive force of the driver 23 and a restoring force of the compression spring 19, the first force-exerting end 18 and the second force-exerting end 6 alternately press the valve film 16 on the first partition wall 13 and the second partition wall 21. Therefore, communications and switch between different channels are achieved. It is to be understood that other elastic elements, such as elastic rubber etc., can be used instead of the compression spring 19. Further, the driver 23 can also be used independently for driving the rocker 5 back and forth without the compression spring 19.

Figure 7:
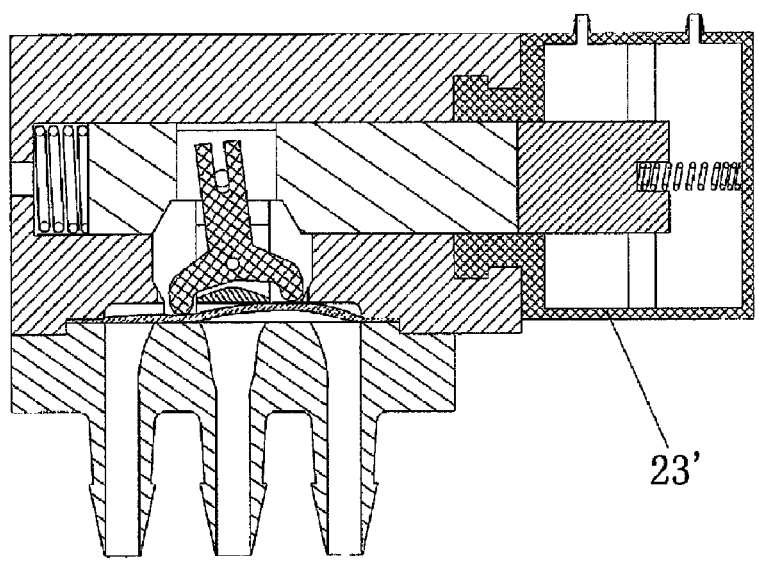
FIG. 7 is a cross-sectional view of a miniature valve in accordance with the second preferred embodiment of the invention.

Referring to FIG. 7, a miniature valve in accordance with the second preferred embodiment of the invention is shown. The second embodiment, essentially similar to the first embodiment, only differs in that the driver 23' is a cylinder driver that can be hydraulically driven.

Figure 8:
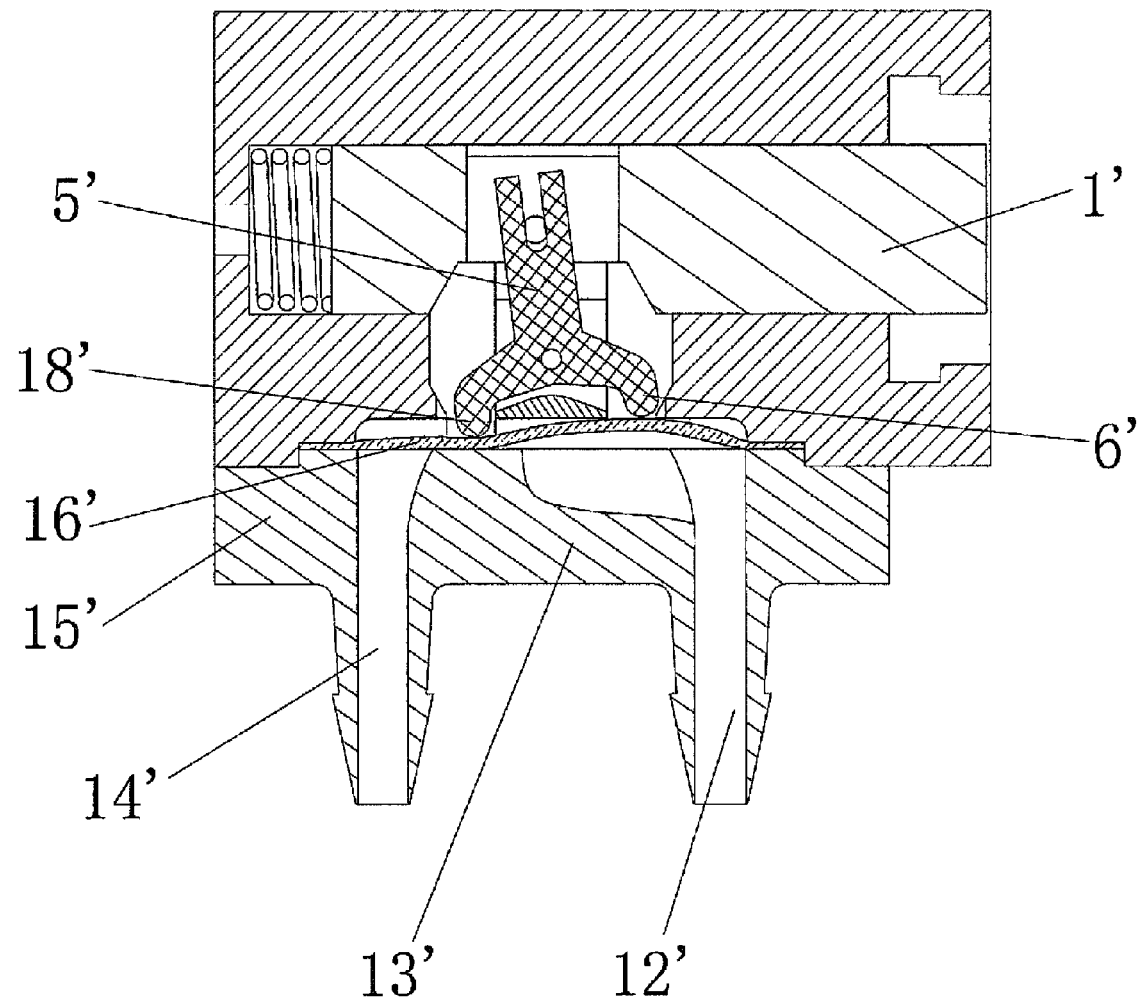
FIG. 8 is a cross-sectional view of a miniature valve in accordance with the third preferred embodiment of the invention.

Referring to FIG. 8, a miniature valve in accordance with the third preferred embodiment of the invention is shown. The third embodiment, essentially similar to the first embodiment, only differs in that the miniature valve of the third embodiment is a two-way valve. Specifically, the valve seat 15' of the miniature valve defines a first channel 14' and a second channel 12', which are spaced by a first partition wall 13'.

In operation, when the driver (e.g., the driver 23 or 23') of the miniature valve drives the rocker 5' to rotate to the first utmost position via the driven bar 1', the valve film 16' is tightly pressed on a sealed surface of the first partition wall 13' by a first force-exerting end 18'. As a result, the opening of the first channel 14' is completely blocked by the valve film 16' so that the first channel 14' and the second channel 12' are separated. When the driver drives the rocker 5' to rotate to the second utmost position via the driven bar 1', the valve film 16' disengages from the sealed surface of the first partition wall 13' and the second force-exerting end 6' presses down the valve film 16', such that the first channel 14' and second channel 12' are communicated.

Each of the above-mentioned miniature valves has following advantages. Firstly, because the liquid chamber communicates with at least one of the channels, there is no dead area inside the miniature valve. Secondly, the switching of the channels is achieved through the elastic distortion of the valve film, the valve film has a small moving distance, so the miniature valve has a slight effect on liquid fluctuation when switching channels.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A miniature valve, comprising:
    a valve body and a driver positioned thereon;
    a supporting device;
    a valve seat provided with a first partition wall and defining a first channel and a second channel, the first channel and the second channel being separated by the first partition wall, the supporting device and the valve seat being connected and together defining a chamber therebetween;
    an elastic valve film, which comprises an elastic characteristic, set in the chamber and dividing the chamber into a liquid chamber and an installing chamber, and the valve film has a size configured to cover the first channel and the second channel and the first partition wall; and
    a rocker rotatablely positioned in the chamber via a shaft and having a force-receiving end and a first force-exerting end, wherein
        the first force-exerting end is configured to press against the valve film,
        the rocker is actuated at or between a first position and a second position, and
        when the rocker is at the first position, the first force-exerting end presses on a first portion of the valve film on only one side in stead of all sides of the first channel so as to cause at least the first portion of the valve film to separate the liquid chamber from communicating with the first channel by sealing off the only one side instead of the all sides of the first channel with the rocker; and
        when the rocker is actuated away from the first position, at least the first portion of the valve film is disengaged from the only one side instead of the all sides of the first channel to allow the first channel to communicate with the liquid chamber.

2. The miniature valve as claimed in claim 1, wherein the rocker further comprises a second force-exerting end locating at the same side of the shaft as the first force-exerting end, the second force-exerting end is configured to be able to press against the valve film.

3. The miniature valve as claimed in claim 2, wherein the valve seat further defines a third channel adjacent to the second channel and further defines a second partition wall spacing the second channel and the third channel, and the valve film has a size configured to cover the third channel and the second partition wall, and wherein the second force-exerting end presses a second portion of the valve film facing the second partition wall on the second partition wall when the rocker locates at the second position.

4. The miniature valve as claimed in claim 3, wherein a shape of the rocker is approximately in a Y-shape, the first force-exerting end and the second force-exerting end locating at one end of the rocker, while the force-receiving end locating at the other end of the rocker, and a mid portion of the rocker rotatably engaging with the shaft.

5. The miniature valve as claimed in claim 4, wherein the supporting device tightly presses a periphery of the valve film on the valve seat.

6. The miniature valve as claimed in claim 5, wherein each of the partition walls has a plane configured for contacting the valve film when the valve film is pressed thereon.

7. The miniature valve as claimed in claim 6, further comprising a driven bar, wherein the driven bar is movably installed in the installing chamber and move along a direction perpendicular to the axis direction of the shaft, with one end thereof connecting to one end of an elastic element and the other end thereof connecting to an output portion of the driver, the other end of the elastic element pressing against a chamber wall of the installing chamber, and wherein the driven bar and the force-receiving end of the rocker is connected via a pivot, the rocker being configured to swing back and forth between a first utmost position and a second utmost position depending on a drive force of the driver and a restoring force of the elastic element.

8. The miniature valve as claimed in claim 7, wherein the driver is selected from the group consisting of a solenoid-driving device and a cylinder-driving device.

9. The miniature valve as claimed in claim 8, wherein each of the channels is configured to form a streamline flow channel together with the liquid chamber in a communicating state.

10. A miniature valve, comprising:
    a valve body comprising an inflow channel, an outflow channel, and a liquid chamber; and
    a close assembly connecting to the valve body and configured to selectively close the inflow channel and the outflow channel, the close assembly comprising a driver, a rocker, and a valve film which comprises an elastic characteristic, the rocker being driven by the driver to move so that movement of the rocker causes the valve film to selectively close the inflow or the outflow channel, wherein
        the valve film comprises a first portion, and the first portion, when pressed upon by the rocker, seals off only one side instead of all sides of the outflow channel with the rocker to prevent the outflow channel from communicating with the liquid chamber when the rocker is at a first position.

11. The miniature valve as claimed in claim 10, wherein the rocker and the valve film are separate components, and the valve film comprises an elastic material, which is located in the liquid chamber and defines a size configured to cover the inflow channel and the outflow channel.

12. The miniature valve as claimed in claim 11, wherein one end of the rocker connects to a transmission element of the driver via a pivoting element, and the other end of the rocker is configured to exert pressure on the valve film so that the valve film being pressed on a sealing surface of a selected channel separates the selected channel from communicating with the liquid chamber.

13. The miniature valve as claimed in claim 12, wherein the outflow channel comprises a first outflow channel and a second outflow channel; and the rocker is in an approximate Y-shape and comprises a force-receiving end connected to the driver and two force-exerting ends configured to selectively exert a pressure on the valve film, and wherein the force-receiving end is driven by the driver to move towards a first direction, thereby driving the force-exerting ends to move, so that the force-exerting end adjacent to the first outflow channel tightly presses the corresponding portion of the valve film on a wall of the first outflow channel and thereby separates communication between the first outflow channel and the liquid chamber; and the force-receiving end is driven by the driver to move towards a direction opposite to the first direction, thereby driving the force-exerting ends so that the force-exerting end adjacent to the second outflow channel tightly presses the corresponding portion of the valve film on a wall of the second outflow channel and thereby separates communication between the second outflow channel and the liquid chamber.

14. The miniature valve as claimed in claim 13, wherein the driver is selected from the group consisting of a solenoid-driving device and a cylinder-driving device.

15. The miniature valve as claimed in claim 14, further comprising an elastic element arranged on one side of the force-receiving end of the rocker, wherein when the driver is not actuated, the elastic element maintains the rocker at a default position which comprises a position either for separating the first outflow channel or for separating the second outflow channel.

16. The miniature valve as claimed in claim 15, wherein a periphery of the valve film is liquid-hermetically fixed at a periphery of the liquid chamber.

* * * * *